United States Patent
Tarao et al.

(10) Patent No.: US 9,050,499 B2
(45) Date of Patent: Jun. 9, 2015

(54) GOLF BALL

(75) Inventors: Toshiyuki Tarao, Kobe (JP); Kuniyasu Horiuchi, Kobe (JP); Kaichiro Wayaku, Amagasaki (JP)

(73) Assignee: DUNLOP SPORTS CO., LTD., Kobe (JP)

( * ) Notice: Subject to any disclaimer, the term of this patent is extended or adjusted under 35 U.S.C. 154(b) by 266 days.

(21) Appl. No.: 13/614,106

(22) Filed: Sep. 13, 2012

(65) Prior Publication Data

US 2013/0072324 A1 Mar. 21, 2013

(30) Foreign Application Priority Data

Sep. 16, 2011 (JP) .................................. 2011-203228

(51) Int. Cl.
| | |
|---|---|
| *A63B 37/00* | (2006.01) |
| *C09D 133/14* | (2006.01) |
| *C09D 175/04* | (2006.01) |
| *C09D 133/06* | (2006.01) |
| *A63B 43/00* | (2006.01) |
| *A63B 45/00* | (2006.01) |

(52) U.S. Cl.
CPC ........ *A63B 37/0003* (2013.01); *C09D 133/066* (2013.01); *C09D 175/04* (2013.01); *A63B 37/0022* (2013.01); *A63B 43/008* (2013.01); *A63B 45/00* (2013.01)

(58) Field of Classification Search
None
See application file for complete search history.

(56) References Cited

U.S. PATENT DOCUMENTS

| | | | | |
|---|---|---|---|---|
| 5,459,220 | A | * 10/1995 | Kennedy | ...................... 528/44 |
| 2003/0187152 | A1 | 10/2003 | Shimura et al. | |
| 2004/0043838 | A1* | 3/2004 | Isogawa et al. | ............... 473/378 |
| 2004/0116623 | A1 | 6/2004 | Isogawa et al. | |
| 2010/0167847 | A1 | 7/2010 | Tarao et al. | |
| 2011/0105247 | A1 | 5/2011 | Tarao et al. | |

FOREIGN PATENT DOCUMENTS

| | | | |
|---|---|---|---|
| JP | 8-182775 | A | 7/1996 |
| JP | 2003-253201 | A | 9/2003 |
| JP | 2004-187829 | A | 7/2004 |
| JP | 2010-131254 | A | 6/2010 |
| JP | 2010-155927 | A | 7/2010 |
| JP | 2010-162336 | A | 7/2010 |
| JP | 2011-92578 | A | 5/2011 |

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball having a paint film which is formed from an aqueous paint and excellent in adhesion to the surface of the golf ball and stain resistance. The present invention provides a golf ball comprising a golf ball body and a paint film formed on the golf ball body, wherein the paint film has a tensile strength ranging from 5 MPa to 45 MPa and is formed from a curing type aqueous polyurethane paint containing (A) an aqueous polyol composition including (a-1) an aqueous acrylic polyol and (a-2) an aqueous polyurethane resin having a tensile strength ranging from 5 MPa to 45 MPa and (B) an aqueous polyisocyanate including hexamethylene diisocyanate and/or a derivative thereof.

19 Claims, 3 Drawing Sheets

GOLF BALL

FIELD OF THE INVENTION

The present invention relates to a technology for painting a golf ball.

DESCRIPTION OF THE RELATED ART

A conventional golf ball has a paint film on the surface of the golf ball body. The paint film is formed to protect the golf ball body from deteriorating due to the exposure of the golf ball body to sunlight and/or the weather and to improve the appearance thereof by imparting a gloss to the golf ball body. A golf ball is repeatedly hit and used. Therefore, the paint film for a golf ball needs to have an adhesion property against the impact. In particular, when a golf ball is hit, the golf ball body deforms. Unless the paint film covering the golf ball body follows the deformation of the golf ball body, the paint film tends to peel off. Further, the paint film may peel off when the golf ball is subject to the friction against the club surface when hitting the golf ball or against the ground surfaces such as sand in a bunker or rough when landing on the ground. A polyurethane paint has been proposed to form a paint film for a golf ball.

Japanese Patent Publication No. 2010-131254A discloses a method for producing a golf ball comprising applying a two-component curing type urethane-based aqueous paint containing (A) an aqueous polyol composition and (B) an aqueous polyisocyanate to a golf ball body having a surface temperature ranging from 30° C. to 80° C., wherein (A) the aqueous polyol composition contains (a-1) an aqueous acrylic polyol, (a-2) an aqueous urethane polyol and (a-3) an aqueous urethane resin; a content of (a-3) the aqueous urethane resin in (A) the aqueous polyol composition ranges from 20 mass % to 80 mass %; and a molar ratio (NCO/OH) of an isocyanate group of (B) the aqueous polyisocyanate to a hydroxyl group of (A) the aqueous polyol composition ranges from 1.25 to 2.50.

Japanese Patent Publication No. 2010-162336A discloses a method for producing a golf ball comprising, overpainting a two-component curing type urethane-based aqueous paint containing (A) an aqueous polyol composition and (B) an aqueous polyisocyanate to a golf ball body multiple times until a paint film has a desired thickness, such that an applied amount (dry mass) of the paint per one time ranges from 5 mg below 80 mg, wherein, (A) the aqueous polyol composition contains (a-1) an aqueous acrylic polyol, (a-2) an aqueous urethane polyol and (a-3) an aqueous urethane resin; a content of (a-3) the aqueous urethane resin in (A) the aqueous polyol composition ranges from 20 mass % to 80 mass %; a molar ratio (NCO/OH) of an isocyanate group of (B) the aqueous polyisocyanate to a hydroxyl group of (A) the aqueous polyol composition ranges from 1.25 to 2.50; and a nonvolatile content of the two-component curing type urethane-based aqueous paint ranges from 15 mass % to 60 mass %.

Japanese Patent Publication No. 2010-155927A discloses a two-component curing type urethane-based aqueous golf ball paint comprising (A) an aqueous polyol composition and (B) an aqueous polyisocyanate, wherein the aqueous golf ball paint has a contact angle of 45° or less to a resin component constituting an outermost layer of a golf ball body and a paint film has reflectivity of 70% or more at an incident angle of 20°.

Japanese Patent Publication No. 2011-92578A discloses a curing type polyurethane aqueous golf ball paint comprising (A) an aqueous polyol composition and (B) an aqueous polyisocyanate, wherein (A) the aqueous polyol composition contains (a-1) an aqueous acrylic polyol, (a-2) an aqueous urethane polyol, and (a-3) an aqueous polyurethane resin; a molar ratio (NCO/OH) of an isocyanate group of (B) the aqueous polyisocyanate to a hydroxyl group of (A) the aqueous polyol composition ranges from 1.25 to 2.50; and a content of a high boiling point solvent having a boiling point of 150° C. or more in the aqueous golf ball paint is more than 0 mass % and 10 mass % or less.

Japanese Patent Publication No. H8-182775A discloses a painted golf ball comprising a golf ball body having a cover formed from an ionomer resin and a paint layer applied thereon, wherein the paint layer consists of a primer layer in direct contact with the cover and other layer, and the primer layer is formed from a two-component curing type urethane paint containing a basic agent having a polyol resin component and a curing agent having an aliphatic or alicyclic polyisocyanate component, and the polyol resin and the polyisocyanate are blended each other such that an amount of a hydroxyl group of the polyol is in excess of an amount of an isocyanate group of the polyisocyanate in the mole ratio.

Japanese Patent Publication No. 2003-253201A discloses a coating composition used for a golf ball comprising (A) a polyester- and/or polyether-containing acrylic polyol having a hydroxyl value of from 30 to 180 mg KOH/g (solid content) and (B) a polyisocyanate, wherein the component (A) is composed of a main chain comprising an acrylic polymer and a side chain comprising a polyester and/or a polyether, and a molar ratio of an isocyanate group in the component (B) to a hydroxyl group in the component (A), [NCO]/[OH], is from 0.5 to 1.5.

Japanese Patent Publication No. 2004-187829A discloses a golf ball having a paint film formed on the surface of the golf ball body, wherein the paint film has a thickness of 6 µm to 13 µm; the paint film contains a base resin made by curing an aqueous polyol and a polyisocyanate; and the aqueous polyol has a hydroxyl value of from 50 mg KOH/g to 100 mg KOH/g (exclusive) and a weight average molecular weight of 4,000 to 20,000.

SUMMARY OF THE INVENTION

As described above, applying an aqueous paint to the surface of the golf ball body has been proposed. However, there was a problem that the surface of the golf ball is easily stained when using the golf ball where a conventional aqueous paint is applied in a round. Particularly, a green color of the turf or dirt tended to penetrate the golf ball surface. The present invention has been made in view of the above circumstances, and an object the present invention is to provide a golf ball having a paint film formed from an aqueous paint and excellent in adhesion to the surface of the golf ball body and stain resistance.

An aqueous paint contains water as a main component of its solvent, and the solvent is not readily volatilized during a painting process. Accordingly, the aqueous paint applied to the surface of the golf ball body is likely to sag. In such a case, since the surface of the golf ball body has a unique shape formed with dimples, there are problems that the paint film has an uneven thickness and poor surface gloss. If a thixotropic agent, a leveling agent and the like are added to make the paint film have the even thickness, drying time becomes very long, resulting in a problem of low productivity. The present invention has been made in view of the above circumstances, and an object of the present invention is to provide a method for producing a golf ball imparting the surface gloss to the golf ball body and forming the paint film with an even thickness.

The present invention, which has solved the above problem, provides a golf ball comprising a golf ball body and a paint film formed on the golf ball body, wherein the paint film has a tensile strength ranging from 5 MPa to 45 MPa and is formed from a curing type aqueous polyurethane paint containing (A) an aqueous polyol composition including (a-1) an aqueous acrylic polyol and (a-2) an aqueous polyurethane resin having a tensile strength ranging from 5 MPa to 45 MPa and (B) an aqueous polyisocyanate including hexamethylene diisocyanate and/or a derivative thereof.

A gist of the golf ball of the present invention resides in using (A) the aqueous polyol composition including (a-2) the aqueous polyurethane resin having the tensile strength of 5 MPa to 45 MPa which is relatively hard, and (B) the aqueous polyisocyanate including hexamethylene diisocyanate and/or the derivative thereof which forms a relatively soft paint film as a curing agent, in the combination of (A) the aqueous polyol composition and (B) the aqueous polyisocyanate. The paint film obtained from the paint having such combination is excellent in adhesion to the surface of the golf ball body and stain resistance.

The present invention further provides a method for producing a golf ball comprising overpainting a curing type aqueous polyurethane paint containing (A) the aqueous polyol composition including (a-1) an aqueous acrylic polyol and (a-2) an aqueous polyurethane resin having a tensile strength ranging from 5 MPa to 45 MPa and (B) an aqueous polyisocyanate including hexamethylene diisocyanate and/or a derivative thereof to a surface of a golf ball body multiple times, thereby forming a paint film.

Overpainting the curing type aqueous polyurethane paint multiple times to the golf ball body prevents sagging of the paint and forms a paint film having an even thickness. In particular, overpainting the curing type aqueous paint preferably comprises applying the curing type aqueous polyurethane paint to the surface of the golf ball body, blowing air to the painted golf ball for a predetermined time, and overpainting the curing type aqueous polyurethane paint. The curing type aqueous polyurethane paint is preferably overpainted to make the paint film formed by one painting have a thickness ranging from 5 μm to 10 μm.

The paint film of the golf ball of the present invention is excellent in adhesion to the surface of the golf ball body and stain resistance. Further, according to the method for producing the golf ball of the present invention, it is possible to form a paint film having an even thickness on the surface of a golf ball body and impart a surface gloss to the golf ball body.

DESCRIPTION OF THE PREFERRED EMBODIMENT

Figure 1:
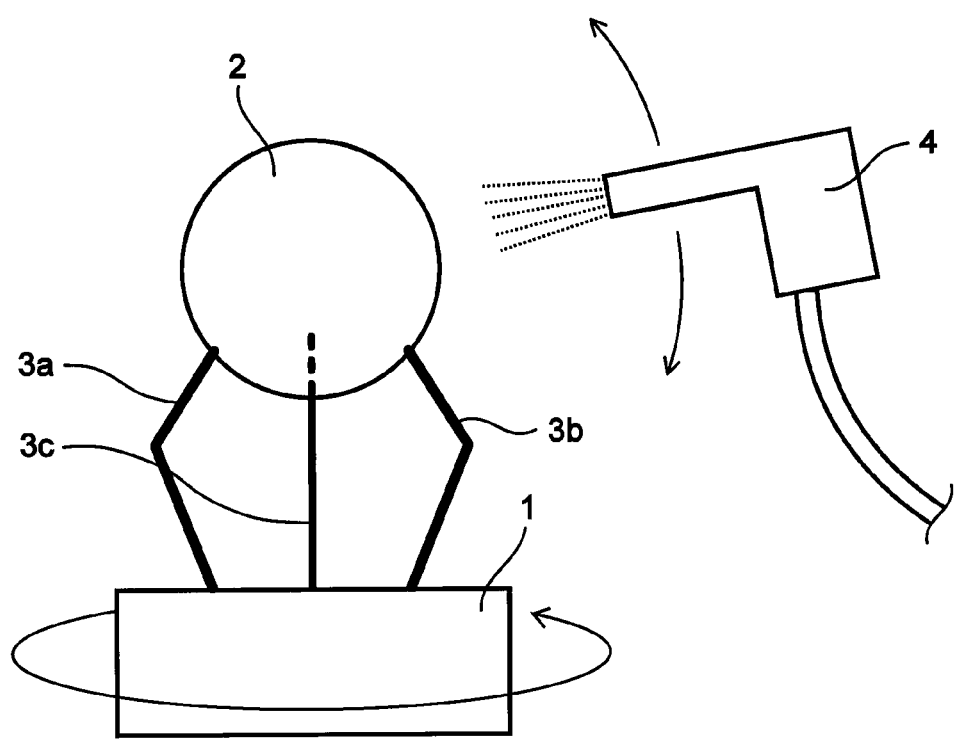
FIG. 1 is a schematic view illustrating an embodiment of applying the paint with an air gun.

The present invention provides a golf ball comprising a golf ball body and a paint film formed on the golf ball body, wherein the paint film has a tensile strength ranging from 5 MPa to 45 MPa and is formed from a curing type aqueous polyurethane paint containing (A) an aqueous polyol composition including (a-1) an aqueous acrylic polyol and (a-2) an aqueous polyurethane resin having a tensile strength ranging from 5 MPa to 45 MPa and (B) an aqueous polyisocyanate including hexamethylene diisocyanate and/or a derivative thereof. In the present invention, the term "aqueous" used herein includes both "water-soluble" and "water-dispersible". The curing type aqueous polyurethane paint forms a paint film by generating a polyurethane through a curing reaction between (A) the aqueous polyol composition and (B) the aqueous polyisocyanate.

First, (A) the aqueous polyol composition used in the present invention will be explained. (A) The aqueous polyol composition contains (a-1) the aqueous acrylic polyol and (a-2) the aqueous polyurethane resin having the tensile strength ranging from 5 MPa to 45 MPa. From the aspect of stain resistance, (A) the aqueous polyol composition used in the present invention preferably does not contain an aqueous urethane polyol.

(a-1) The aqueous acrylic polyol used in the present invention is an aqueous acrylic resin or an aqueous acrylic polymer having a plurality of hydroxyl groups, and is obtained, for example, by copolymerizing a (meth)acrylic monomer having a hydroxyl group and a (meth)acrylic monomer having no hydroxyl group.

Examples of the (meth)acrylic monomer having a hydroxyl group include (meth)acrylic acid esters having a hydroxyl group, such as 2-hydroxyethyl (meth)acrylate, 2-hydroxypropyl (meth)acrylate, 2-hydroxybutyl (meth)acrylate, alkylene glycol mono(meth)acrylate, and polyalkylene glycol mono(meth)acrylate. These (meth)acrylic monomers having a hydroxyl group may be used individually or in combination of two or more of them.

Examples of the (meth)acrylic monomer having no hydroxyl group include: (meth)acrylic unsaturated carboxylic acids such as (meth)acrylic acid; (meth)acrylic acid ester such as methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, hexyl (meth)acrylate, 2-ethylhexyl (meth)acrylate, cyclohexyl (meth)acrylate, octyl (meth)acrylate, and decyl (meth)acrylate; and another (meth)acrylic monomer such as (meth)acrylonitrile, and (meth)acrylamide. These (meth)acrylic monomers having no hydroxyl group may be used individually or in combination of two or more of them. In the present invention, the term "(meth)acrylic" means "acrylic" and/or "methacrylic."

Further, in addition to the (meth)acrylic monomer, (a-1) the aqueous acrylic polyol may contain another monomer component which has a hydroxyl group and/or another monomer component which has no hydroxyl group, as long as they do not impair the effects of the present invention. Examples of another monomer component which has a hydroxyl group include unsaturated alcohols such as 3-methyl-3-butene-1-ol, 3-methyl-2-butene-1-ol, 2-methyl-3-butene-2-ol, 2-methyl-2-butene-1-ol, 2-methyl-3-butene-1-ol, and allyl alcohol. Examples of another monomer component which has no hydroxyl group include: aromatic vinyl compounds such as styrene and α-methyl styrene; and ethylenically unsaturated carboxylic acids such as maleic acid and itaconic acid. These other monomer components may be used individually or in combination of two or more of them.

The hydroxyl value of (a-1) the aqueous acrylic polyol is preferably 50 mg KOH/g or more, more preferably 60 mg KOH/g or more, and even more preferably 70 mg KOH/g or more, and is preferably 150 mg KOH/g or less, more preferably 140 mg KOH/g or less, and even more preferably 130 mg KOH/g or less. If the hydroxyl value of (a-1) the aqueous acrylic polyol falls within the above range, the gloss of the paint film can be further enhanced. In addition, the hardness and water-resistance of the paint film can be enhanced. In the present invention, the hydroxyl value can be measured by using, for example, an acetylation method, in accordance with JIS K 1557-1.

The glass transition temperature of (a-1) the aqueous acrylic polyol is preferably 20° C. or more, and more preferably 22° C. or more, and even more preferably 25° C. or more, and is preferably 60° C. or less, and more preferably 57° C. or less, and even more preferably 55° C. or less. If the glass transition temperature of (a-1) the aqueous acrylic polyol falls within the above range, the production of the aqueous paint becomes easy. Further, the impact-resistance of the paint film can be enhanced.

The weight average molecular weight of (a-1) the aqueous acrylic polyol is preferably 3,000 or more, more preferably 5,000 or more, and even more preferably 8,000 or more, and is preferably 50,000 or less, more preferably 45,000 or less, and even more preferably 40,000 or less. If the weight average molecular weight of (a-1) the aqueous acrylic polyol falls within the above range, the water-resistance and impact-resistance of the paint film can be enhanced. The weight average molecular weight of (a-1) the aqueous acrylic polyol can be measured, for example, by gel permeation chromatography (GPC), using polystyrene as a standard material, tetrahydrofuran as an eluate, and an organic solvent system GPC columns (for example, by using "Shodex (registered trademark) KF series" available from Showa Denko K.K.).

Further, the average number (average hydroxyl group number) of hydroxyl groups contained in a molecule of (a-1) the aqueous acrylic polyol is preferably 5 or more, and more preferably 10 or more, and even more preferably 20 or more, and is preferably 100 or less, and more preferably 50 or less, and even more preferably 40 or less. If the average hydroxyl group number of (a-1) the aqueous acrylic polyol is 5 or more, because of the high reactivity with (B) the aqueous polyisocyanate, a tough paint film can be formed and the adhesion to the surface of the golf ball body becomes better. If the average hydroxyl group number is 100 or less, the water-resistance of the paint film formed becomes good. It is noted that the average hydroxyl group number of (a-1) the aqueous acrylic polyol can be calculated based on the hydroxyl value and the weight average molecular weight.

(a-1) The aqueous acrylic polyol is preferably used in the form of an aqueous liquid in which (a-1) the aqueous acrylic polyol is dissolved or dispersed in water. A method for dissolving or dispersing the acrylic polyol in water includes, without any limitation, for example, a method in which a monomer having a carboxyl group such as an unsaturated carboxylic acid like (meth)acrylic acid and maleic acid is copolymerized, and the carboxyl group is neutralized with a base, or a method in which a (meth)acrylic monomer having a hydroxyl group is subjected to the emulsion-polymerization in the presence of an emulsifier.

When the aqueous liquid in which (a-1) the aqueous acrylic polyol is dissolved or dispersed in water is used, the content (non-volatile content) of (a-1) the aqueous acrylic polyol component in the aqueous liquid is preferably 20 mass % or more, more preferably 25 mass % or more, even more preferably 30 mass % or more, and is preferably 70 mass % or less, more preferably 65 mass % or less, and even more preferably 60 mass % or less. If the content of (a-1) the aqueous acrylic polyol component in the aqueous liquid falls within the above range, (a-1) the aqueous acrylic polyol can be easily mixed with (a-2) the aqueous polyurethane resin or the like, thereby facilitating the preparation of (A) the aqueous polyol composition. A method for measuring the non-volatile content will be described later.

Specific examples of (a-1) the aqueous acrylic polyol include "WA-98 (hydroxyl value: 110 mg KOH/g to 120 mg/KOH/g, Tg: 15° C. to 20° C.) available from Wayaku Paint Co., Ltd., "WE-306 (hydroxyl value: 100 mg KOH/g, Tg: 50° C.)" available from DIC Corporation, and trade names "Bayhydrol (registered trademark) VPLS2058", "Bayhydrol (registered trademark) VPLS2235", available from Sumika Bayer Urethane Co., Ltd.

Next, (a-2) the aqueous polyurethane resin contained in (A) the aqueous polyol composition will be described. (a-2) The aqueous polyurethane resin is not particularly limited, as long as it is an aqueous resin having a plurality of urethane bonds within the molecule. For example, the polyurethane resin is a product having urethane bonds formed in a molecule thereof by a reaction between a polyisocyanate component and a high molecular weight polyol component. Further, a chain extension reaction with a low molecular weight polyol or a low molecular weight polyamine may be conducted where necessary.

The polyisocyanate component which can constitute (a-2) the aqueous polyurethane resin is not limited, as long as it has at least two isocyanate groups. Examples of the polyisocyanate include an aromatic polyisocyanate such as 2,4-toluene diisocyanate, 2,6-toluene diisocyanate, a mixture of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), para-phenylene diisocyanate (PPDI); an alicyclic polyisocyanate such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI). These may be used either alone or as a mixture of at least two of them.

Examples of the polyol component which can constitute (a-2) the aqueous polyurethane resin include a low molecular weight polyol having a molecular weight of less than 500 and a high molecular weight polyol having a molecular weight of 500 or more. Examples of the low molecular weight polyol are a diol such as ethylene glycol, diethylene glycol, triethylene glycol, 1,3-butanediol, 1,4-butanediol, neopentyl glycol, 1,6-hexanediol; and a triol such as glycerin, trimethylol propane, and hexane triol. Examples of the high-molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol.

The polyamine component that constitutes the polyurethane resin where necessary may include any low-molecular weight polyamine, as long as it has at least two amino groups. The polyamine component includes an aliphatic polyamine such as ethylenediamine, propylenediamine, and hexamethylenediamine, an aromatic polyamine such as tolylenediamine, xylylenediamine, and diaminodiphenyl methane; and an alicyclic polyamine such as diaminocyclohexyl methane, piperazine, isophoronediamine; hydrazine or derivatives thereof such as succinic acid dihydrazide, adipic acid dihydrazide, phthalic acid dihydrazide. As the low molecular weight polyol or low molecular weight polyamine, alkanolamine such as diethanolamine, monoethanolamine can be used.

The polyurethane resin has no limitation on the constitutional embodiments thereof. Examples of the constitutional embodiments are the embodiment where the polyurethane resin consists of the polyisocyanate component and the high-molecular weight polyol component; the embodiment where the polyurethane resin consists of the polyisocyanate component, the high-molecular weight polyol component and the low-molecular weight polyol component; and the embodiment where the polyurethane resin consists of the polyisocyanate component, the high-molecular weight polyol component, the low-molecular weight polyol component, and the low-molecular weight polyamine component; and the embodiment where the polyurethane resin consists of the polyisocyanate component, the high-molecular weight polyol component and the polyamine component.

(a-2) The aqueous polyurethane resin preferably has a tensile strength of 5 MPa or more, more preferably 10 MPa or more, even more preferably 15 MPa or more, and (a-2) the aqueous polyurethane resin preferably has a tensile strength of 45 MPa or less, more preferably 43 MPa or less, and even more preferably 40 MPa or less. If the tensile strength of (a-2) the aqueous polyurethane resin falls within the above range, the paint film excellent in stain resistance and adhesion can be formed. The tensile strength of (a-2) the aqueous polyurethane resin can be measured by using, for example, Autograph available from SHIMADZU CORPORATION.

In the present invention, the tensile strength of (a-2) the aqueous polyurethane resin is a physical property value of the film obtained from (a-2) the aqueous polyurethane resin, and the measurement method will be described later.

(a-2) The aqueous polyurethane resin is preferably used in the form of an aqueous liquid in which (a-2) the aqueous polyurethane resin is dissolved or dispersed in water. For example, when an aqueous liquid in which (a-2) the aqueous polyurethane resin is dissolved or dispersed in water is used, the content (non-volatile content) of (a-1) the aqueous polyurethane resin component in the aqueous liquid is preferably 10 mass % or more, more preferably 12 mass % or more, and even more preferably 15 mass % or more, and is preferably 50 mass % or less, more preferably 47 mass % or less, and even more preferably 45 mass % or less. If the content of (a-2) the aqueous polyurethane resin component in the aqueous liquid falls within the above range, (a-2) the aqueous polyurethane resin can be easily mixed with (a-1) the aqueous acrylic polyol or the like, thereby facilitating the preparation of (A) the aqueous polyol composition. A method for measuring the non-volatile content will be described later.

If a water dispersion is used as (a-2) the aqueous polyurethane resin, the volume average particle diameter of the polyurethane resin is preferably 50 nm or more, more preferably 55 nm or more, and even more preferably 60 nm or more, and is preferably 300 nm or less, more preferably 250 nm or less, and even more preferably 200 nm or less. If the volume average particle diameter of the water dispersion falls within the above range, the gloss of the paint film can be enhanced. The volume average particle diameter of the water dispersion can be measured by using a laser diffraction/scattering type particle size distribution measurement apparatus.

As a method for dissolving or dispersing (a-2) the aqueous polyurethane resin in water, for example, a self-emulsification method or a phase inversion emulsification method may be used.

In the self-emulsification method, the polyurethane resin is dissolved or dispersed in water, without using an emulsifier, by introducing an ionic group in a molecule of the polyurethane resin. For example, the polyurethane resin can be dissolved or dispersed in water by introducing a carboxyl group in a molecule of the polyurethane resin and neutralizing the carboxyl group. The ionic group includes non-neutralized functional groups which are capable of being neutralized such as a carboxyl group or an amino group and functional groups which are ionized by neutralizing these non-neutralized functional groups with an inorganic metal compound or amines.

As a method for introducing the ionic group in a molecule of the polyurethane resin, a known method can be employed. For example, a method in which a polyol having an ionic group is used as a part or the whole of the polyol component, a method in which a chain extender having an ionic group is used as a part or the whole of the chain extender component, or a method in which the polyol and the chain extender each having an ionic group are used as a part of the polyol component and a part or the whole of the chain extender component, respectively, may be employed.

The polyol having the ionic group includes, for example, a polyester polyol having a carboxyl group or a polyester polyol having a sulfonic acid group. Examples of the chain extender having the ionic group include low molecular weight polyols such as dimethylol propionic acid, dimethylol butanoic acid, dihydroxy propionic acid, and dihydroxysuccinic acid.

In the phase inversion emulsification method, a relatively low molecular weight urethane prepolymer is forced to be emulsified and dispersed by a high shear in the presence of an emulsifier, and is thereafter subjected to a chain extension reaction with a low molecular weight polyol component or a low molecular weight polyamine component.

Specific examples of (a-2) the aqueous polyurethane resin include: "Sancure 835", "Sancure 898", and "Sancure 777" available from The Lubrizol Corporation; and trade names "SUPERFLEX (registered trademark) 300" and "SUPERFLEX (registered trademark) 500H" available from Dai-ichi Kogyo Seiyaku Co., Ltd.

The content of (a-2) the aqueous polyurethane resin in (A) the aqueous polyol composition is preferably 20 mass % or more, more preferably 25 mass % or more, and even more preferably 30 mass % or more, and is preferably 80 mass % or less, more preferably 75 mass % or less, and even more preferably 70 mass % or less in non-volatile content. If the content of (a-2) the aqueous polyurethane resin in (A) the aqueous polyol composition falls within the above range, the adhesion of the paint film to the surface of a golf ball body can be enhanced.

Further, as the blending ratio of (a-1) the aqueous acrylic polyol to (a-2) the aqueous polyurethane resin in (A) the aqueous polyol composition ((a-1) the aqueous acrylic polyol/(a-2) the aqueous polyurethane resin) is preferably 30/70 or more, more preferably 40/60 or more, and is preferably 70/30 or less, and more preferably 60/40 or less in a mass ratio of the non-volatile content. If the blending ratio (a-1)/(a-2) falls within the above range, the gloss of the paint film which is obtained from the curing type aqueous polyurethane paint of the present invention, the adhesion thereof to the golf ball body, and the durability thereof can be enhanced.

(A) The aqueous polyol composition preferably contains water as a dispersion medium. In this case, the non-volatile content in (A) the aqueous polyol composition is preferably 20 mass % or more, more preferably 25 mass % or more, and even more preferably 30 mass % or more, and is preferably 85 mass % or less, more preferably 80 mass % or less, and even more preferably 75 mass % or less. If the non-volatile content in (A) the aqueous polyol composition is 20 mass % or more, reactivity between (A) the aqueous polyol composition and (B) the aqueous polyisocyanate described below becomes high. Further, if the non-volatile content in (A) the aqueous polyol composition is 85 mass % or less, the viscosity is not excessively high, and the painting becomes good. A method for measuring the non-volatile content will be described below.

(B) The aqueous polyisocyanate will be described. (B) The aqueous polyisocyanate is an aqueous compound having a plurality of isocyanate groups. For example, (B) the aqueous polyisocyanate may be a polyisocyanate and/or a derivative thereof to be modified to disperse or dissolve in water. Specific examples thereof include the aqueous polyisocyanate obtained by modifying a polyisocyanate component with polyoxyalkylene ether alcohol.

(B) The aqueous polyisocyanate used in the present invention preferably contains, as a polyisocyanate component, (b-1) hexamethylene diisocyanate and/or the derivative thereof. If (b-1) the hexamethylene diisocyanate and/or the derivative thereof is used, the resultant paint film does not become too hard and a tough paint film is obtained. From the aspect of the stain resistance and adhesion, (B) the aqueous polyisocyanate used in the present invention preferably does not contain other polyisocyanate components (such as isophorone diisocyanate and/or a derivative thereof).

Examples of the derivative of the hexamethylene diisocyanate include: uretdione or isocyanurate; an adduct obtained by a reaction between hexamethylene diisocyanate and a low molecular weight triol such as trimethylolpropane or glycerin; an allophanate-modified product; and a biuret-modified product. It is preferred that a free diisocyanate is removed from the derivative of the hexamethylene diisocyanate. One example of the allophanate-modified product is a trifunctional polyisocyanate which is obtained by further reacting hexamethylene diisocyanate with a urethane bond formed through a reaction between hexamethylene diisocyanate and a low molecular weight diol. One example of the biuret-modified products is a trifunctional polyisocyanate which is obtained by further reacting hexamethylene diisocyanate with a urea bond formed through a reaction between hexamethylene diisocyanate and a low molecular weight diamine. The hexamethylene diisocyanate and the derivatives thereof may be used individually or in combination of two or more types.

As (b-1) the hexamethylene diisocyanate and/or the derivative thereof, a mixture of a biuret product and isocyanurate product of hexamethylene diisocyanate is preferred.

In the curing type aqueous polyurethane paint according to the present invention, the molar ratio (NCO/OH) of the isocyanate group (NCO) of (B) the aqueous polyisocyanate to the hydroxyl group (OH) of (A) the aqueous polyol composition preferably ranges from 1.3 to 2.5. If the molar ratio (NCO/OH) is less than 1.3, the amount of the isocyanate groups is too small, and leveling effect cannot be obtained. Therefore, the appearance of the obtained paint film may deteriorate. Further, if the molar ratio (NCO/OH) is more than 2.5, the amount of the isocyanate groups is excessive, and the appearance of the obtained paint film may deteriorate as well as the obtained paint film may be hard and fragile. The reason why the appearance of the obtained paint film deteriorates is that an excessive amount of isocyanate groups in the paint may promote a reaction between the moisture in the air and the isocyanate groups, thereby generating a lot of carbon dioxide gas. The molar ratio (NOC/OH) is preferably 1.3 or more, more preferably 1.4 or more, and is preferably 2.5 or less, more preferably 2.4 or less.

The curing type aqueous polyurethane paint used in the present invention may contain a solvent. If the curing type aqueous polyurethane paint contains a solvent, the surface tension of the aqueous paint is lowered and the wettability of the aqueous paint to the golf ball body surface improves. The content of the solvent is preferably 0.5 mass % or more, and more preferably 1.0 mass % or more. On the other hand, if the content of the solvent is too high, drying temperature of the aqueous paint is getting higher or the drying time is getting longer. Therefore, the content of the solvent is preferably 10 mass % or less, more preferably 9.5 mass % or less, even more preferably 9.0 mass % or less. The solvent may be contained in either (A) the aqueous polyol composition or (B) the aqueous polyisocyanate. If the solvent is not contained in any component, the solvent can be post added to the curing type aqueous polyurethane paint.

Specific examples of the solvent include an organic solvent such as acetone, methylethylketone, ethyl acetate, N,N-dimethylformamide, N-methylpyrrolidone or the like. Further, as the above organic solvent, it is preferable to use a so-called film forming additive. The film forming additive can enhance the film forming ability of the paint film, thereby improving the properties of the resultant paint film. Further, since the film forming additive is less volatile, it is possible to reduce the amount of the volatile organic solvent.

Examples of the film forming additive are a glycolic ether type of the solvent such as ethyleneglycol monomethylether, ethyleneglycol monoethylether, ethyleneglycol monobutylether, ethyleneglycol monohexylether, ethyleneglycol 2-ethelhexylether, propyleneglycol butylether, dipropyleneglycol butylether, diethyleneglycol monoethylether, diethyleneglycol monobuthylether, and the like, and a glycolic ester type of the solvent such as ethyleneglycol monomethylether acetate, ethyleneglycol monoethylether acetate, propyleneglycol monomethylether acetate, diethyleneglycol monoethylether acetate, diethyleneglycol monobuthylether acetate, and the like. The above organic solvents or the film forming additives can be used either alone or in combination of at least two of them.

The curing type aqueous polyurethane paint used in the present invention preferably has a non-volatile content of 15 mass % or more and 60 mass % or less. If the non-volatile content in the paint is less than 15 mass %, the sagging of the paint applied to the golf ball body cannot be suppressed and the thickness of the paint film becomes uneven. On the other hand, if the non-volatile content in the paint excesses 60 mass %, the leveling of the aqueous paint is lowered and the appearance of the resultant painted golf ball may deteriorate. The non-volatile content of the paint is preferably 20 mass % or more, more preferably 25 mass % or more, and is preferably 60 mass % or less, more preferably 50 mass % or less.

The viscosity of the curing type aqueous polyurethane paint of the present invention is preferably 50 mPa·s or more, more preferably 60 mPa·s or more, even more preferably 70 mPa·s or more, and is preferably 350 mPa·s or less, more preferably 340 mPa·s or less, 330 mPa·s or less. If the viscosity is 50 mPa·s or more, the paint does not sag when applying the paint on the surface of the golf ball body, and the paint film having the even thickness to the higher extent can be obtained, and if the viscosity is 350 mPa·s or less, spraying becomes good, and thus the appearance (gloss) of the painted golf ball becomes better in the case of spraying the paint with an air gun. The method of measuring the viscosity of the curing type aqueous polyurethane paint will be described later.

The curing type aqueous polyurethane paint of the present invention may contain, in addition to the above components, additives, such as a pigment, an ultraviolet absorber, an antioxidant, a light stabilizer, a fluorescent brightener, an antiblocking agent, a leveling agent, a slip agent, and a viscosity modifier, which are generally contained in the paint for a golf ball, where necessary.

The paint film formed from the curing type aqueous polyurethane paint preferably has an elongation at break of 50% or more, more preferably 75% or more, even more preferably 100% or more, and the paint film has an elongation at break of 250% or less, more preferably 225% or less, even more preferably 200% or less. If the elongation at break is too low, the paint film becomes too hard and fragile, and the adhesion may deteriorate. Further, if the elongation at break is too high, the paint film becomes too soft and thus stain resistance becomes worse.

The paint film preferably has a 10% modulus of 5 MPa or more, more preferably 8 MPa or more, and the paint film preferably has a 10% modulus of 30 MPa or less, more preferably 27 MPa or less. If the 10% modulus is too low, the paint film becomes too soft, and stain resistance may deteriorate. If the 10% modulus is too high, the paint film becomes too hard and fragile, and the adhesion may deteriorate.

The tensile strength of the paint film is preferably 5 MPa or more, more preferably 10 MPa or more, and is preferably 45 MPa or less, more preferably 40 MPa or less. If the tensile strength is too low, the paint film becomes too soft and the stain resistance may deteriorate. If the tensile strength is too high, the paint film becomes too hard and fragile, and the adhesion may be lowered.

Next, the method for producing the golf ball of the present invention will be explained. The method for producing the golf ball of the present invention comprises overpainting a curing type aqueous polyurethane paint containing (A) the aqueous polyol composition including (a-1) an aqueous acrylic polyol and (a-2) an aqueous polyurethane resin having a tensile strength ranging from 5 MPa to 45 MPa and (B) an aqueous polyisocyanate including hexamethylene diisocyanate and/or a derivative thereof to a surface of a golf ball body multiple times, thereby forming a paint film.

The method of applying the curing type aqueous polyurethane paint to the golf ball body is not limited, and a method which is publicly known for applying a two-component mixing type paint may be used. For example, (A) the aqueous polyol composition is mixed with (B) the aqueous polyisocyanate, and the obtained mixture is applied to the golf ball with an air gun or by an electrostatic coating method. Among them, using the air gun is preferred because the paint film having the even thickness to the higher extent can be obtained.

In the case of using the air gun, (A) the aqueous polyol composition and (B) the aqueous polyisocyanate can be mixed little by little for use. Further, (A) the aqueous polyol composition and (B) the aqueous polyisocyanate are fed with the respective pumps and continuously mixed in a constant ratio through the line mixer such as the static mixer located in the steam line just before the air gun. Alternatively, (A) the aqueous polyol composition and (B) the aqueous polyisocyanate can be air-sprayed respectively with the spray gun having the device for controlling the mixing ratio thereof.

A manner in which the painting is performed by using the air gun is not limited, and includes, for example, a manner shown in FIG. 1. FIG. 1 is a schematic diagram illustrating an exemplary painting manner using an air gun. The manner of painting includes supporting the golf ball 2 with the three prongs 3a to 3c, which are set up on a horizontally rotatable rotating element 1, rotating the rotating element 1 while supporting the golf ball 2, spacing a spray distance between the spray gun 4 and the golf ball 2, and spraying an atomized paint while moving the air gun 4 in up and down direction. In this case, the rotation speed of the rotating element 1 is preferably 300 rpm or more, and more preferably 400 rpm or more, and is preferably 800 rpm or less, and more preferably 700 rpm or less.

An ambient temperature at which the paint is applied is not limited, but is preferably 10° C. or more and 45° C. or less, and more preferably room temperature (generally, 20° C. to 30° C.). Additionally, an ambient humidity at which the paint is applied is not limited, but is preferably 65% or less.

The times for overpainting are not limited, as long as the times are at least two times, and may be changed appropriately depending upon a desired firm thickness. For example, when the desired film thickness ranges from 10 μm to 20 μm, the times for overpainting are preferably 4 times or less, more preferably 3 times or less. If the times for overpainting are 4 times or less, the applied amount of the paint per one painting does not become too little and the evenness of the thickness of the obtained paint film is enhanced. From the aspect of processability, it is particularly preferred that the times for overpainting are two times.

The thickness of the paint film obtained by drying the paint applied in one painting is preferably 5 μm or more, more preferably 7 μm or more and is preferably 10 μm or less, more preferably 9 μm or less. If the thickness of the paint film obtained by drying the paint applied in one painting falls within the above range, the leveling becomes good and the even thickness can be maintained.

The method of forming the golf ball of the present invention preferably comprises applying the curing type aqueous polyurethane paint to the surface of the golf ball body, blowing air to the painted golf ball for a predetermined time, and overpainting the curing type aqueous polyurethane paint. Blowing air to the painted golf ball for a predetermined time prevents the sagging of the aqueous paint. The predetermined time for blowing air is preferably 3 seconds or longer, more preferably 5 seconds or longer, and is 40 seconds or shorter, more preferably 35 or shorter. If the predetermined time for blowing air is too short, the paint may sag. If the predetermined time for blowing air is too long, the production efficiency may deteriorate.

Figure 2:
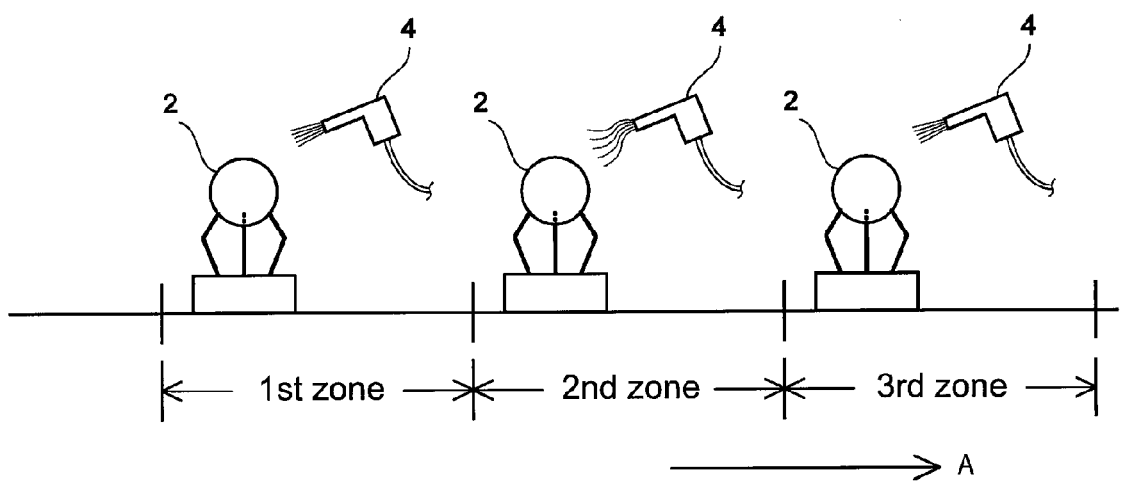
FIG. 2 is an explanatory illustration schematically showing one example of the painting process line.

FIG. 2 is an explanatory illustration schematically showing the paint line which is a preferable embodiment of the method for producing the golf ball of the present invention. In this embodiment, the curing type aqueous polyurethane paint is applied to the surface of the golf ball body in a first zone, air is blown to the painted golf ball for a predetermined time in a second zone, and the curing type aqueous polyurethane paint is overpainted in a third zone. In the first zone and the third zone, the aqueous paint is preferably applied using a spray gun. In the second zone, blowing air is, for example, preferably conducted by providing only air using the spray gun. Golf ball 2 proceeds toward direction A.

The ambient temperature when blowing air is preferably 10° C. or more, more preferably 15° C. or more, even more preferably 20° C. or more, and is preferably 45° C. or less, more preferably 40° C. or less, even more preferably 35° C. or less. The ambient temperature when blowing air is more preferably room temperature (usually 20° C. to 30° C.). If the ambient temperature when blowing air falls within the above range, the leveling becomes good and the evenness of the thickness can be enhanced.

A wind speed when blowing air is preferably 10 m/s or more, more preferably 12 m/s or more, and is preferably 30 m/s or less, more preferably 28 m/s or less. If the wind speed is large, the golf ball may fall down from the prong. If the wind speed is small, the evenness of the thickness becomes difficult to maintain.

The curing type aqueous polyurethane paint overpainted to the golf ball body is dried, for example, at the temperature ranging from 30° C. to 70° C. for 1 hour to 24 hours to form a paint film. Since the golf ball body uses a thermoplastic material, the drying temperature is preferably 40° C. or less. In the case of drying at the temperature of 40° C. or less, tack-free time is preferably within 6 hours, more preferably within 4 hours.

The paint film formed on the golf ball of the present invention preferably consists of the multiple layers formed by overpainting the curing type aqueous polyurethane paint. The thickness of one layer of the multiple layers is preferably 5 μm or more, and is preferably 10 μm or less, more preferably 9 μm or less. The total thickness of the paint film is not limited, but is preferably 10 μm or more, and is preferably 50 μm or less, more preferably 40 μm or less. If the thickness is less than 10 μm, the paint film is easy to wear off due to continued use of the golf ball, and if the thickness is more than 50 μm, the effect of the dimples is reduced, resulting in lowering flying performance of the golf ball The construction of the golf ball of the present invention is not limited, as long as the golf ball of the present invention comprises a golf ball body and a paint film. The golf ball body of the present invention may be a one-piece golf ball, a two-piece golf ball, a multi-piece golf ball including a three-piece golf ball, or a wound golf ball. The present invention can be applied appropriately to any one of the above golf balls.

Examples of the cover material constituting the cover of the inventive golf ball include, various resins such as an ionomer resin, a polyester resin, polyurethane resins like a thermoplastic urethane resin and a thermosetting urethane resin, and a polyamide resin; and various thermoplastic elastomers such as a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark) (e.g. "Elastollan XNY97A")" available from BASF Japan Ltd, and thermoplastic styrene elastomers having a trade name "Rabalon (registered trademark) (e.g. "Rabalon T3221C")" and a thermoplastic polyester elastomer having a trade name "Primalloy" commercially available from Mitsubishi Chemical Corporation, and the like. These cover materials may be used solely or in combination of two or more types thereof.

The cover in the present invention may contain a pigment component such as a white pigment (for example, titanium oxide), a blue pigment, a red pigment, and the like, a weight adjusting agent such as calcium carbonate, barium sulfate, and the like, a dispersant, an antioxidant, an ultraviolet absorber, a light stabilizer, a fluorescent material or a fluorescent brightener, or the like, as long as they do not impair the performance of the cover.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding a cover, the concave portions called "dimple" are usually formed on the surface of the golf ball body. The total number of the dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

After the cover is molded, the mold is opened and the golf ball body is taken out from the mold, and as necessary, the golf ball body is preferably subjected to surface treatments such as deburring, cleaning, and sandblast. If desired, a mark may be formed.

Next, the core used for the wound golf ball, two-piece golf ball, multi-piece golf ball, and the one-piece golf ball body will be explained.

As the core or the one-piece golf ball body, a conventionally known rubber composition (hereinafter simply referred to as "core rubber composition" occasionally) may be employed, and they can be molded by, for example, heat-pressing a rubber composition containing a base rubber, a crosslinking initiator, and a co-crosslinking agent.

As the base rubber, typically preferred is the high cis-polybutadiene having cis-1,4-bond in a proportion of 40% or more, more preferably 70% or more, even more preferably 90% or more in view of its superior repulsion property. The co-crosslinking agent includes; for example, an α,β-unsaturated carboxylic acid having 3 to 8 carbon atoms or a metal salt thereof, more preferably a metal salt of acrylic acid or methacrylic acid. As the metal salt, for example, a zinc salt, a magnesium salt, a calcium salt, an aluminum salt and a sodium salt may be used, and among them, the zinc salt is preferred. The amount of the co-crosslinking agent to be used is preferably 20 parts or more by mass, and is preferably 50 parts or less by mass. As the crosslinking initiator, an organic peroxide is preferably used. Examples of the organic peroxide for use in the present invention are dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 1.5 parts by mass or less, more preferably 1.0 parts by mass or less based on 100 parts by mass of the base rubber. The core rubber composition may further contain an organic sulfur compound. As the organic sulfur compound, a diphenyl disulfide or a derivative thereof may be preferably used. The amount of the organic sulfur compound is preferably 0.1 part by mass or more, more preferably 0.3 part by mass or more, and preferably 5.0 parts by mass or less, more preferably 3.0 parts by mass or less relative to 100 parts by mass of the base rubber.

The core rubber composition may further contain a weight adjusting agent such as zinc oxide or barium sulfate, an antioxidant, or a colored powder in addition to the base rubber, the crosslinking initiator, the co-crosslinking agent and the organic sulfur compound. The conditions for press-molding the core rubber composition should be determined appropriately depending on the rubber composition. The press-molding is preferably carried out for 10 to 60 minutes at the temperature of 130° C. to 200° C. or the press-molding is preferably carried out in a two-step heating, for example, for 20 to 40 minutes at the temperature of 130° C. to 150° C., and continuously for 5 to 15 minutes at the temperature of 160° C. to 180° C.

In the case that the golf ball of the present invention is a multi-piece golf ball including a three-piece golf ball, the intermediate layer is disposed between the core and the cover. The material for the intermediate layer includes, for example, a thermoplastic resin such as a polyurethane resin, an ionomer resin, a polyamide resin, and polyethylene; and a thermoplastic elastomer such as a styrene elastomer, a polyolefin elastomer, a polyurethane elastomer, a polyester elastomer; and a cured product of a rubber composition. Herein, examples of the ionomer resin include one prepared by neutralizing at least a part of carboxyl groups in a copolymer composed of ethylene and an $\alpha,\beta$-unsaturated carboxylic acid with a metal ion, and one prepared by neutralizing at least a part of carboxyl groups in a terpolymer composed of ethylene, an $\alpha,\beta$-unsaturated carboxylic acid and an $\alpha,\beta$-unsaturated carboxylic acid ester with a metal ion. The intermediate layer may further contain a specific gravity adjusting agent such as barium sulfate, tungsten and the like, an antioxidant, and a pigment.

EXAMPLES

Hereinafter, the present invention will be described in detail by way of example. The present invention is not limited to examples described below. Various changes and modifications can be made without departing from the spirit and scope of the present invention.

[Evaluation Methods]
(1) Appearance of the Painted Golf Ball

The appearance of the painted golf ball was visually observed, and evaluated in accordance with the following evaluation criteria.

Evaluation Criteria

E (Excellent): a state in which the surface was smooth and glossy.

G (Good): a state in which the surface was slightly uneven, and was not so glossy.

P (Poor): a state in which the surface was substantially uneven, and was not glossy.

(2) Adhesion of Paint Film

A metal-headed driver (W#1) was installed on a swing robot manufactured by True Temper Co. Each painted golf ball was repeatedly hit at a head speed of 45 m/s 50 times, and thereafter the peeling state of the paint film was observed. The evaluation was made in accordance with the following evaluation criteria.

Evaluation Criteria

E (Excellent): An area in which the paint film peeled off was 1% or less with respect to the total area of the paint film.

G (Good): An area in which the paint film peeled off was more than 1% and 5% or less with respect to the total area of the paint film.

P (Poor): An area in which the paint film peeled off was more than 5% with respect to the total area of the paint film.

(3) Evenness of the Film Thickness

Figure 3:
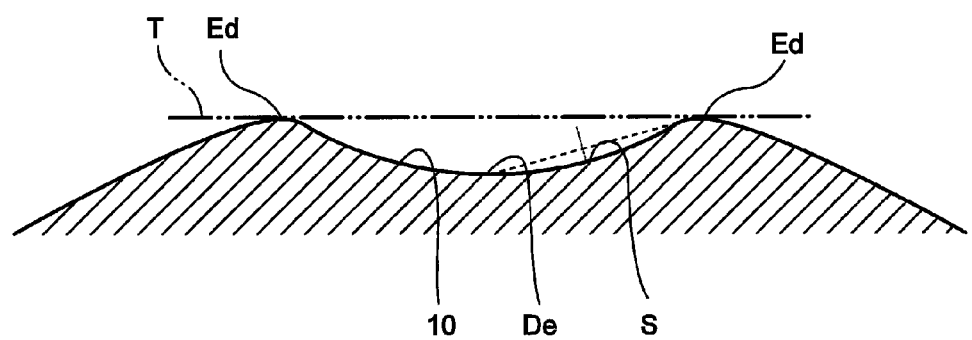
FIG. 3 is an expanded sectional view of the dimples formed on the surface of the golf ball body.

A part of the surface of the painted golf ball was cut out to form a test piece (about 7 square millimeters) for observing the film thickness of the paint film. As to 6 dimples, the thicknesses of the paint film at the bottom and the edge, and a slope surface of each dimple were measured by using a microscope to obtain the respective averages, and the evaluation was made in accordance with the following evaluation criteria. Measuring points of the bottom and the edge, and the slope surface of each dimple will be described with reference to FIG. 3. FIG. 3 is a schematic diagram illustrating a cross-section including the bottom De of a dimple 10 and the center of a golf ball 2. The bottom De of the dimple is the deepest portion of the dimple 10. The edges Ed are tangent points at which the dimple 10 is tangent to a tangent line T which is drawn tangent to the farthest opposite ends of the dimple 10. A measurement point S on the slope surface is a point at which the slope surface of the dimple intersects the perpendicular line extending toward the dimple 10 from the center point of the straight line connecting between the bottom De and the edge Ed of the dimple.

Evaluation Criteria

The average of the film thicknesses at the bottoms of the dimples, the average of the film thicknesses at the edges of the dimples, and the average of the film thicknesses at the slope surfaces of the dimples are represented by x, y, and z, respectively.

E (Excellent): $|x-y| \leq 1.5$ μm and $|y-z| \leq 1.5$ μm and $|z-x| \leq 1.5$ μm G (Good): $|x-y| \leq 3$ μm and $|y-z| \leq 3$ μm and $|z-x| \leq 3$ μm P (Poor): $|x-y| > 3$ μm or $|y-z| > 3$ μm or $|z-x| > 3$ μm (4) Tensile Strength of the Aqueous Polyurethane Resin, Tensile Strength of the Paint Film, Elongation at Break of the Paint Film (%)

An aqueous polyurethane resin and a curing type aqueous polyurethane paint were used to produce a film having a film thickness of 500 μm. Drying was performed under the condition that preliminary drying was performed at room temperature for 15 hours, and final drying was performed at 80° C. for 6 hours, and at 120° C. for 20 minutes. Subsequently, the obtained film was stamped out to form a test piece, and the tensile strength and the elongation at break were measured with a Tensile universal material testing Instrument. The measurement was performed under the condition that the length of the test piece was 30 mm and the crosshead speed was 200 mm/min. The tensile strength is a strength at the time of breaking.

(5) Non-Volatile Content

Approximately 2 g of a sample was put on an aluminum plate and was forced to be dried at 150° C. for 1 hour, and the non-volatile content was determined, based on the mass before drying and the mass after drying.

(6) Viscosity

The viscosity of the curing type aqueous polyurethane paint for a golf ball was measured by using a single cylinder rotational viscometer ("Viscotester VT-04F" available from Riontech Co., Ltd). The measurement was performed by using a rotor No. 3, and the rotation speed of the rotor was 62.5 min$^{-1}$, and the measurement temperature was 25° C. The viscosity of the curing type aqueous polyurethane paint according to the present invention was measured immediately after (A) the aqueous polyol composition and (B) the aqueous polyisocyanate were mixed.

(7) Stain Resistance

The obtained golf ball was dipped in the aqueous iodine tincture solution prepared by diluting iodine tincture 40 times for 30 seconds, and then taken out. After wiping off the extra aqueous iodine tincture solution adhered to the surface of the golf ball, the color of the golf ball (L, a, b) before and after dipping was measured using a color difference meter (CM3500D available from Konica Minolta Holdings, Inc.). The color difference (ΔE) was calculated by the following expression;

$$\Delta E = [(\Delta L)^2 + (\Delta a)^2 + (\Delta b)^2]^{1/2}$$

As the color difference value is larger, the degree of discoloration is larger.

Evaluation Criteria
E (Excellent): ΔE is 20 or less.
G (Good): ΔE is more than 20 and less than 25.
P (Poor): ΔE is 25 or more.

[Production of the Two-Piece Golf Ball]

(1) Preparation of Solid Core

The core rubber composition shown in Table 1 was kneaded and heat-pressed with upper and lower molds each having a spherical cavity at the heating condition of 160° C. for 13 minutes to obtain the spherical core having a diameter of 39.3 mm.

TABLE 1

| Core formulation | Amount (parts) |
|---|---|
| Polybutadiene rubber | 100 |
| Zinc oxide | 5.6 |
| Zinc acrylate | 22.0 |
| Calcium carbonate | 21.0 |
| Dicumyl peroxide | 1.85 |

Notes on Table 1:
Polybutadiene rubber: BR-51 (cis content: 96%) available from JSR.
Zinc oxide: "Ginrei R" produced by Toho-Zinc.
Zinc acrylate: "ZNDA-90S" produced by NIHON JYORYU KOGYO.
Calcium carbonate: "BF-300" produced by SHIRAISHI CALCIUM KAISHA, LTD
Dicumyl peroxide: "Percumyl D" produced by NOF Corporation.

(2) Preparation of the Cover Material

The materials shown in Table 2 were mixed using a twin-screw kneading extruder to obtain the cover composition in the form of pellet. The extrusion was conducted in the following conditions: screw diameter=45 mm, screw revolutions=200 rpm, and screw L/D=35. The cover composition was heated to from 200° C. to 260° C. at the die position of the extruder.

TABLE 2

| Cover material | Amount (parts) |
|---|---|
| Himilan 1605 | 40 |
| Himilan 1706 | 30 |
| Himilan 1707 | 30 |
| Titanium oxide | 2 |

Notes on Table 2:
HIMILAN 1605: an ionomer resin of a sodium ion-neutralized ethylene-methacrylic acid copolymer, available from MITSUI-DUPONT POLYCHEMICAL.
HIMILAN 1706: an ionomer resin of a zinc ion-neutralized ethylene-methacrylic acid copolymer, available from MITSUI-DUPONT POLYCHEMICAL.
HIMILAN 1707: an ionomer resin of a sodium ion-neutralized ethylene-methacrylic acid copolymer, available from MITSUI-DUPONT POLYCHEMICAL.

(3) Preparation of the Golf Ball Body

The cover composition thus prepared was directly injection-molded onto the core to form the cover, thereby obtaining the two-piece golf ball body having a diameter of 42.7 mm. The upper and lower molds for forming the cover have a spherical cavity with pimples. The part of the pimples can serve as a hold pin which is retractable. When forming the golf ball body, the hold pins were protruded to hold the core, and the resin heated at 210° C. was charged into the mold held under the pressure of 80 tons for 0.3 seconds. After cooling for 30 seconds, the molds were opened and then the golf ball body was discharged. Dimples were formed on the surface of the golf ball.

(4) Formation of Paint Film (a-1) The aqueous acrylic polyol and (a-2) the aqueous polyurethane resin, and an aqueous urethane polyol where necessary, were blended to prepare (A) the aqueous polyol composition. To (A) the obtained aqueous polyol composition, (B) the aqueous polyisocyanate was slowly added while mixing them to prepare the curing type aqueous polyurethane paints having formulations shown in Tables 3 and 4. The obtained curing type aqueous polyurethane paints were immediately applied to the surface of the golf ball using the air gun. The painting conditions were shown in Tables 3 and 4. In case of applying the paint twice, air was blown at a wind speed of 17 m/s using the spray gun to the golf ball after applying the paint first time. After blowing air, the curing type aqueous polyurethane paint was applied again using the spray gun. After painting, the painted golf ball was dried in an oven at 40° C. for 14 hours, and formed a paint film. The obtained golf ball was evaluated, and the results thereof were shown in Tables 3 and 4.

TABLE 3

| | | | Painted golf ball | 1 | 2 | 3 | 4 | 5 | 6 | 7 | 8 | 9 | 10 |
|---|---|---|---|---|---|---|---|---|---|---|---|---|---|
| Paint | Formulation | (A) Aqueous polyol composition | (a-1) Aqueous acrylic polyol | 10 | 30 | 50 | 70 | 90 | 50 | 50 | 50 | 50 | 50 |
| | | | Aqueous urethane polyol | — | — | — | — | — | — | — | — | — | — |
| | | | (a-2) Aqueous polyurethane resin 1 | 90 | 70 | 50 | 30 | 10 | 50 | 50 | 50 | 50 | — |
| | | | (a-2) Aqueous polyurethane resin 2 | — | — | — | — | — | — | — | — | — | 50 |
| | | | (a-2) Aqueous polyurethane resin 3 | — | — | — | — | — | — | — | — | — | — |
| | | (B) Aqueous polyisocyanate | (b-1) HDI derivative | 11 | 31 | 52 | 73 | 93 | 38 | 45 | 87 | 104 | 52 |
| | | | (b-2) IPDI derivative | — | — | — | — | — | — | — | — | — | — |
| | Mass ratio of (b-1)/(b-2) in (B) Aqueous polyisocyanate | | | 100/0 | 100/0 | 100/0 | 100/0 | 100/0 | 100/0 | 100/0 | 100/0 | 100/0 | 100/0 |
| | Molar ratio (NCO/OH) of NCO of (B) aqueous polyisocyanate/OH of (A) aqueous polyol composition | | | 1.5 | 1.5 | 1.5 | 1.5 | 1.5 | 1.1 | 1.3 | 2.5 | 3.0 | 1.5 |
| Conditions of applying | Times for overpainting | | | 2 | 2 | 2 | 2 | 2 | 2 | 2 | 2 | 2 | 2 |
| | Thickness of 1st Paint film (μm) | | | 5 | 5 | 5 | 5 | 5 | 5 | 5 | 5 | 5 | 5 |
| | Thickness of 2nd Paint film (μm) | | | 5 | 5 | 5 | 5 | 5 | 5 | 5 | 5 | 5 | 5 |
| | Air blowing temperature (° C.) | | | 25 | 25 | 25 | 25 | 25 | 25 | 25 | 25 | 25 | 25 |
| | Air blowing time (sec.) | | | 20 | 20 | 20 | 20 | 20 | 20 | 20 | 20 | 20 | 20 |
| Property of paint film | 10% modulus (kgf/cm$^2$) | | | 50 | 80 | 100 | 150 | 200 | 50 | 80 | 170 | 300 | 80 |
| | Elongation at break (%) | | | 150 | 135 | 120 | 110 | 85 | 180 | 135 | 100 | 70 | 200 |
| | Tensile strength (MPa) | | | 10 | 16 | 20 | 30 | 40 | 10 | 16 | 34 | 60 | 16 |
| Painted Golf ball | Total thickness of Paint film (μm) | | | 10 | 10 | 10 | 10 | 10 | 10 | 10 | 10 | 10 | 10 |
| | Appearance of golf ball | | | E | E | E | E | E | E | E | E | E | E |
| | Evenness of film thickness | | | E | E | E | E | E | E | E | E | E | E |
| | Adhesion of paint film | | | E | E | E | E | G | E | E | E | P | E |
| | Stain resistance | | | G | E | E | E | E | G | E | E | E | P |

TABLE 4

| Painted golf ball | | | | 11 | 12 | 13 | 14 | 15 | 16 | 17 | 18 | 19 | 20 |
|---|---|---|---|---|---|---|---|---|---|---|---|---|---|
| Paint | Formulation | (A) Aqueous polyol composition | (a-1) Aqueous acrylic polyol | 50 | 20 | 50 | 50 | 50 | 50 | 50 | 50 | 50 | 30 |
| | | | Aqueous urethane polyol | — | 30 | — | — | — | — | — | — | — | 20 |
| | | | (a-2) Aqueous polyurethane resin 1 | — | — | 50 | 50 | 50 | 50 | 50 | 50 | 50 | 50 |
| | | | (a-2) Aqueous polyurethane resin 2 | — | — | — | — | — | — | — | — | — | — |
| | | | (a-2) Aqueous polyurethane resin 3 | 50 | 50 | — | — | — | — | — | — | — | — |
| | | (B) Aqueous polyisocyanate | (b-1) HDI derivative | 52 | 39 | 26 | 52 | 52 | 52 | 52 | 52 | 52 | 52 |
| | | | (b-2) IPDI derivative | — | 13 | 26 | — | — | — | — | — | — | — |
| | Mass ratio of (b-1)/(b-2) in (B) Aqueous polyisocyanate | | | 100/0 | 75/25 | 50/50 | 100/0 | 100/0 | 100/0 | 100/0 | 100/0 | 100/0 | 100/0 |
| | Molar ratio (NCO/OH) of NCO of (B) aqueous polyisocyanate/OH of (A) aqueous polyol composition | | | 1.5 | 1.5 | 1.5 | 1.5 | 1.5 | 1.5 | 1.5 | 1.5 | 1.5 | 1.5 |
| Conditions of applying | Times for overpainting | | | 2 | 2 | 2 | 1 | 1 | 2 | 2 | 2 | 2 | 2 |
| | Thickness of 1st Paint film (μm) | | | 5 | 5 | 5 | 5 | 12 | 5 | 5 | 5 | 5 | 5 |
| | Thickness of 2nd Paint film (μm) | | | 5 | 5 | 5 | — | — | 5 | 5 | 5 | 5 | 5 |
| | Air blowing temperature (° C.) | | | 25 | 25 | 25 | 25 | 25 | 50 | 5 | 25 | 25 | 25 |
| | Air blowing time (sec.) | | | 20 | 20 | 20 | 20 | 20 | 20 | 1 | 45 | 20 |
| Property of paint film | 10% modulus (kgf/cm$^2$) | | | 200 | 80 | 250 | 100 | 100 | 100 | 100 | 100 | 100 | 50 |
| | Elongation at break (%) | | | 75 | 135 | 50 | 120 | 120 | 120 | 120 | 120 | 120 | 150 |
| | Tensile strength (MPa) | | | 40 | 16 | 50 | 20 | 20 | 20 | 20 | 20 | 20 | 10 |
| Painted Golf ball | Total thickness of Paint film (μm) | | | 10 | 10 | 10 | 5 | 12 | 10 | 10 | 10 | 10 | 10 |
| | Appearance of golf ball | | | E | E | E | E | E | G | E | E | G | E |
| | Evenness of film thickness | | | E | E | E | E | P | E | G | G | E | E |
| | Adhesion of paint film | | | P | E | P | P | E | E | E | E | E | E |
| | Stain resistance | | | E | P | E | E | E | E | E | E | E | G |

Notes on Tables 3 and 4:
Formulation: mass parts (based on non-volatiles)
Aqueous polyurethane resin 1 (a-2): Tensile strength of 34 MPa
Aqueous polyurethane resin 2 (a-2): Tensile strength of 48 MPa
Aqueous polyurethane resin (a-2): Tensile strength of 1 MPa
Aqueous acrylic polyol: WA-98 available from Wayaku Paint Co., Ltd. (hydroxyl value: from 110 mgKOH/g to 120 mgKOH/g, Tg: 15° C. to 20° C.)
Aqueous urethane polyol: "FLEXOREZ(registered trademark)) UD-350W" (hydroxyl value: 325 mgKOH/g, non-volatile: 88 mass %) available from available from King Industries, Inc.
Aqueous polyurethane resin 1: "Sancure 835" (Tensile strength: 34 MPa) available from The Lubrizol Corporation.
Aqueous polyurethane resin 2: "Sancure 1073C" (Tensile strength: 48 MPa) available from The Lubrizol Corporation.
Aqueous polyurethane resin 3: "Sancure 2104" (Tensile strength: 1 MPa) available from The Lubrizol Corporation.
HDI derivative: "WG-84B" (a mixture of a biuret-modified product of hexamethylene diisocyanate and an isocyanurate-modified product of hexamethylene diisocyanate, non-volatile: 75%, NCO: 12%) available from Wayaku Paint Co., Ltd.
IPDI derivative: "DNW-5000" (non-volatile: 80%, NCO: 13.5%) available from DIC Corporation.

Golf balls No. 1 to No. 8 and No. 20 are the golf balls comprising a golf ball body and a paint film formed on the golf ball body, wherein the paint film has a tensile strength ranging from 5 MPa to 45 MPa and is formed from a curing type aqueous polyurethane paint which contains (A) an aqueous polyol composition including (a-1) an aqueous acrylic polyol and (a-2) an aqueous polyurethane resin having a tensile strength of 5 MPa to 45 MPa and (B) an aqueous polyisocyanate including hexamethylene diisocyanate and/or a derivative thereof. In all of those golf balls, the golf balls having a paint film excellent in adhesion to the surface of the golf ball body and stain resistance were obtained. Golf ball No. 12 is the case using a conventional curing type aqueous polyurethane paint. An aqueous polyol composition containing an aqueous acrylic polyol, an aqueous polyurethane resin and an aqueous urethane polyol is used, but stain resistance was low. Comparing Golf ball No. 3 with Golf ball No. 20 indicates that using the aqueous polyol composition containing the aqueous urethane polyol tends to lower stain resistance. Thus, the curing type aqueous polyurethane paint of the present invention preferably does not contain the aqueous urethane polyol.

The golf ball of the present invention is suitable as a painted golf ball. This application is based on Japanese Patent applications No. 2011-203228 filed on Sep. 16, 2011, the contents of which are hereby incorporated by reference.

The invention claimed is:

1. A golf ball comprising a golf ball body and a paint film formed on the golf ball body, wherein the paint film has a tensile strength ranging from 5 MPa to 45 MPa, and is formed from a curing type aqueous polyurethane paint containing:
   (A) an aqueous polyol composition including
      (a-1) an aqueous acrylic polyol and
      (a-2) an aqueous polyurethane resin having a tensile strength ranging from 5 MPa to 45 MPa; and
   (B) an aqueous polyisocyanate including hexamethylene diisocyanate and/or a derivative thereof, and
   wherein (A) the aqueous polyol composition does not contain an aqueous urethane polyol.

2. The golf ball according to claim 1, wherein a blending ratio of (a-1) the aqueous acrylic polyol to (a-2) the aqueous polyurethane resin in (A) the aqueous polyol composition ((a-1) the aqueous acrylic polyol/(a-2) the aqueous polyurethane resin) is from 30/70 to 70/30 in a mass ratio.

3. The golf ball according to claim 1, wherein a molar ratio (NCO/OH) of an isocyanate group of (B) the aqueous polyisocyanate to a hydroxyl group of (A) the aqueous polyol composition ranges from 1.3 to 2.5.

4. The golf ball according to claim 1, wherein (a-1) the aqueous acrylic polyol has a glass transition temperature in a range from 20° C. to 60° C.

5. The golf ball according to claim 1, wherein (a-1) the aqueous acrylic polyol has a weight average molecular weight in a range from 3,000 to 50,000.

6. The golf ball according to claim 1, wherein (B) the aqueous polyisocyanate including hexamethylene diisocyanate and/or a derivative thereof includes a mixture of a biuret product and an isocyanurate product of hexamethylene diisocyanate.

7. The golf ball according to claim 1, wherein the paint film consists of multiple layers.

8. The golf ball according to claim 1, wherein one layer of the multiple layers has a thickness ranging from 5 µm to 10 µm.

9. The golf ball according to claim 1, wherein the paint film has a 10% modulus of 5 MPa or more and 30 MPa or less.

10. The golf ball according to claim 1, wherein the paint film has an elongation at break of 50% or more and 250% or less.

11. A method for producing a golf ball comprising:
overpainting a curing type aqueous polyurethane paint containing
(A) an aqueous polyol composition including
 (a-1) an aqueous acrylic polyol and
 (a-2) an aqueous polyurethane resin having a tensile strength ranging from 5 MPa to 45 MPa and
(B) an aqueous polyisocyanate including hexamethylene diisocyanate and/or a derivative thereof to a surface of a golf ball body multiple times, thereby forming a paint film having a tensile strength ranging from 5 MPa to 45 MPa,
wherein (A) the aqueous polyol composition does not contain an aqueous urethane polyol.

12. The method for producing the golf ball according to claim 11, wherein overpainting the curing type aqueous polyurethane paint comprises applying the curing type aqueous polyurethane paint to the surface of the golf ball body, blowing air to the painted golf ball for a predetermined time, and overpainting the curing type aqueous polyurethane paint.

13. The method for producing the golf ball according to claim 12, wherein the curing type aqueous polyurethane paint is overpainted to make the paint film formed by one painting have a thickness ranging from 5 µm to 10 µm.

14. The method for producing the golf ball according to claim 11, wherein a blending ratio of (a-1) the aqueous acrylic polyol to (a-2) the aqueous polyurethane resin in (A) the aqueous polyol composition ((a-1) the aqueous acrylic polyol/(a-2) the aqueous polyurethane resin) is from 30/70 to 70/30 in a mass ratio.

15. The method for producing the golf ball according to claim 11, wherein a molar ratio (NCO/OH) of an isocyanate group (NCO) of (B) the aqueous polyisocyanate to a hydroxyl group (OH) of (A) the aqueous polyol composition ranges from 1.3 to 2.5.

16. The method for producing the golf ball according to claim 12, wherein applying the paint is conducted at an ambient temperature in a range from 10° C. to 45° C. and at an ambient humidity of 65% or less.

17. The method for producing the golf ball according to claim 12, wherein a time for blowing the air ranges from 3 seconds to 40 seconds.

18. The method for producing the golf ball according to claim 12, wherein an ambient temperature for blowing the air ranges from 10° C. to 45° C.

19. The method for producing the golf ball according to claim 12, wherein a wind speed for bowing the air ranges from 10 m/s to 30 m/s.

* * * * *